United States Patent
Schroeder

(10) Patent No.: US 11,149,994 B2
(45) Date of Patent: Oct. 19, 2021

(54) UNEVEN FLOW VALVE FOR A CALORIC REGENERATOR

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 430 days.

(21) Appl. No.: 16/242,067

(22) Filed: Jan. 8, 2019

(65) Prior Publication Data

US 2020/0217563 A1 Jul. 9, 2020

(51) Int. Cl.
*F25B 21/00* (2006.01)
*F25B 41/00* (2021.01)

(52) U.S. Cl.
CPC .............. *F25B 21/00* (2013.01); *F25B 41/00* (2013.01); *F25B 2321/002* (2013.01)

(58) Field of Classification Search
CPC .... F25B 21/00; F25B 41/00; F25B 2321/002; Y02B 30/00; F25D 11/00
USPC .......................................................... 62/3.1
See application file for complete search history.

(56) References Cited

U.S. PATENT DOCUMENTS

| 668,560 | A | 2/1901 | Fulner et al. |
|---|---|---|---|
| 1,985,455 | A | 12/1934 | Mosby |
| 2,671,929 | A | 3/1954 | Gayler |
| 2,765,633 | A | 10/1956 | Muffly |
| 3,618,265 | A | 11/1971 | Croop |
| 3,816,029 | A | 6/1974 | Bowen et al. |
| 3,844,341 | A | 10/1974 | Bimshas, Jr. et al. |
| 3,956,076 | A | 5/1976 | Powell, Jr. et al. |
| 4,037,427 | A | 7/1977 | Kramer |
| 4,102,655 | A | 7/1978 | Jeffery et al. |
| 4,107,935 | A | 8/1978 | Steyert, Jr. |
| 4,197,709 | A | 4/1980 | Hochstein |

(Continued)

FOREIGN PATENT DOCUMENTS

| CA | 2893874 A1 | 6/2014 |
|---|---|---|
| CA | 2919117 A1 | 1/2015 |

(Continued)

OTHER PUBLICATIONS

Stefano Dall'Olio, et al., Numerical Simulation of a Tapered Bed AMR, Technical University of Denmark, 2015, 2 pages.

(Continued)

*Primary Examiner* — Ana M Vazquez
(74) *Attorney, Agent, or Firm* — Dority & Manning, P.A.

(57) ABSTRACT

A caloric regenerator system includes a flow body that defines a plurality of cold side channels, a plurality of hot side channels and a central passage. A port body is received within the central passage of the flow body such that the flow body is rotatable relative to the port body. The port body defines a hot side port and a cold side port. A width of the hot side port is less than a width of the cold side port. An annular caloric regenerator is in flow communication with the plurality of cold side channels and the plurality of hot side channels such that a heat transfer fluid is flowable into the annular caloric regenerator through the plurality of cold side channels and out of the annular caloric regenerator through the plurality of hot side channels.

20 Claims, 12 Drawing Sheets

(56) References Cited

U.S. PATENT DOCUMENTS

| | | |
|---|---|---|
| 4,200,680 A | 4/1980 | Sasazawa et al. |
| 4,259,843 A | 4/1981 | Kausch |
| 4,332,135 A | 6/1982 | Barclay et al. |
| 4,408,463 A | 10/1983 | Barclay |
| 4,507,927 A | 4/1985 | Barclay |
| 4,507,928 A | 4/1985 | Johnson |
| 4,549,155 A | 10/1985 | Halbach |
| 4,554,790 A | 11/1985 | Nakagome et al. |
| 4,557,228 A | 12/1985 | Samodovitz |
| 4,599,866 A | 7/1986 | Nakagome et al. |
| 4,625,519 A | 12/1986 | Hakuraku et al. |
| 4,642,994 A | 2/1987 | Barclay et al. |
| 4,735,062 A | 4/1988 | Woolley et al. |
| 4,741,175 A | 5/1988 | Schulze |
| 4,785,636 A | 11/1988 | Hakuraku et al. |
| 4,796,430 A | 1/1989 | Malaker et al. |
| 5,062,471 A | 11/1991 | Jaeger |
| 5,091,361 A | 2/1992 | Hed |
| 5,156,003 A | 10/1992 | Yoshiro et al. |
| 5,190,447 A | 3/1993 | Schneider |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,467,274 B2 | 10/2002 | Barclay et al. |
| 6,517,744 B1 | 2/2003 | Hara et al. |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,840,302 B1 | 1/2005 | Tanaka et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 8,978,391 B2 | 3/2015 | Muller et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,746,214 B2 | 8/2017 | Zimm et al. |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 * | 1/2018 | Schroeder ............... F25B 21/00 |
| 9,927,155 B2 | 3/2018 | Boeder et al. |
| 9,978,487 B2 | 5/2018 | Katter et al. |
| 10,006,675 B2 | 6/2018 | Benedict et al. |
| 10,018,385 B2 | 7/2018 | Radermacher et al. |
| 10,684,044 B2 | 6/2020 | Schroeder |
| 2002/0040583 A1 | 4/2002 | Barclay et al. |
| 2002/0066368 A1 | 6/2002 | Zornes |
| 2002/0087120 A1 | 7/2002 | Rogers et al. |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187510 A1 | 9/2004 | Jung |
| 2004/0187803 A1 | 9/2004 | Regev |
| 2004/0250550 A1 | 12/2004 | Bruck |
| 2005/0017394 A1 | 1/2005 | Hochsmann et al. |
| 2005/0046533 A1 | 3/2005 | Chell |
| 2005/0109490 A1 | 5/2005 | Harmon et al. |
| 2005/0217278 A1 | 10/2005 | Mongia et al. |
| 2005/0263357 A1 | 12/2005 | Kuwahara |
| 2005/0274676 A1 | 12/2005 | Kumar et al. |
| 2006/0130518 A1 | 6/2006 | Kang et al. |
| 2006/0231163 A1 | 10/2006 | Hirosawa et al. |
| 2006/0279391 A1 | 12/2006 | Xia |
| 2007/0130960 A1 | 6/2007 | Muller et al. |
| 2007/0220901 A1 | 9/2007 | Kobayashi |
| 2008/0223853 A1 | 9/2008 | Muller et al. |
| 2008/0236171 A1 | 10/2008 | Saito et al. |
| 2008/0236175 A1 | 10/2008 | Chaparro Monferrer et al. |
| 2008/0303375 A1 | 12/2008 | Carver |
| 2009/0032223 A1 | 2/2009 | Zimmerman et al. |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2009/0314860 A1 | 12/2009 | Wang et al. |
| 2009/0320499 A1 | 12/2009 | Muller et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel et al. |
| 2010/0122488 A1 | 5/2010 | Fukai |
| 2010/0150747 A1 | 6/2010 | Mehta et al. |
| 2010/0162747 A1 | 7/2010 | Hamel et al. |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0061398 A1 | 3/2011 | Shih et al. |
| 2011/0062821 A1 | 3/2011 | Chang et al. |
| 2011/0082026 A1 | 4/2011 | Sakatani et al. |
| 2011/0094243 A1 | 4/2011 | Carroll et al. |
| 2011/0129363 A1 | 6/2011 | Sakai et al. |
| 2011/0154832 A1 | 6/2011 | Barve et al. |
| 2011/0162388 A1 | 7/2011 | Barve et al. |
| 2011/0168363 A9 | 7/2011 | Reppel et al. |

(56) References Cited

U.S. PATENT DOCUMENTS

| | | |
|---|---|---|
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2011/0314836 A1 | 12/2011 | Heitzler et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0060526 A1 | 3/2012 | May et al. |
| 2012/0079834 A1 | 4/2012 | Dinesen |
| 2012/0222427 A1 | 9/2012 | Hassen |
| 2012/0222428 A1 | 9/2012 | Celik et al. |
| 2012/0266591 A1 | 10/2012 | Morimoto et al. |
| 2012/0266607 A1 | 10/2012 | Morimoto et al. |
| 2012/0267090 A1 | 10/2012 | Kruglick |
| 2012/0272665 A1 | 11/2012 | Watanabe et al. |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0020529 A1 | 1/2013 | Chang et al. |
| 2013/0104568 A1 | 5/2013 | Kuo et al. |
| 2013/0106116 A1 | 5/2013 | Kuo et al. |
| 2013/0145573 A1 | 6/2013 | Bizhanzadeh |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0200293 A1 | 8/2013 | Zhao et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0157793 A1 | 6/2014 | Johnson et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0311165 A1 | 10/2014 | Watanabe et al. |
| 2014/0325996 A1 | 11/2014 | Muller |
| 2014/0366557 A1 | 12/2014 | Mun et al. |
| 2015/0007582 A1 | 1/2015 | Kim et al. |
| 2015/0027133 A1 | 1/2015 | Benedict |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0089960 A1 | 4/2015 | Takahashi et al. |
| 2015/0096307 A1 | 4/2015 | Watanabe et al. |
| 2015/0114007 A1 | 4/2015 | Neilson et al. |
| 2015/0168030 A1 | 6/2015 | Leonard et al. |
| 2015/0184903 A1 | 7/2015 | Mun et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362224 A1 | 12/2015 | Benedict et al. |
| 2015/0362225 A1 | 12/2015 | Schwartz |
| 2015/0369524 A1 | 12/2015 | Ikegami et al. |
| 2016/0000999 A1 | 1/2016 | Focht et al. |
| 2016/0025385 A1 | 1/2016 | Auringer et al. |
| 2016/0032920 A1 | 2/2016 | Hatami Aghdam |
| 2016/0084544 A1 | 3/2016 | Radermacher et al. |
| 2016/0091227 A1 | 3/2016 | Leonard et al. |
| 2016/0146515 A1 | 5/2016 | Momen et al. |
| 2016/0216012 A1 | 7/2016 | Benedict et al. |
| 2016/0238287 A1 | 8/2016 | Benedict |
| 2016/0273811 A1 | 9/2016 | Smith et al. |
| 2016/0282021 A1 | 9/2016 | Zhao et al. |
| 2016/0298880 A1 | 10/2016 | Humburg |
| 2016/0355898 A1 | 12/2016 | Vieym Villegas et al. |
| 2016/0356529 A1 | 12/2016 | Humburg |
| 2016/0367982 A1 | 12/2016 | Pennie |
| 2017/0059213 A1 | 3/2017 | Barclay et al. |
| 2017/0059215 A1 | 3/2017 | Watanabe et al. |
| 2017/0071234 A1 | 3/2017 | Garg |
| 2017/0138648 A1 | 5/2017 | Cui et al. |
| 2017/0176083 A1 | 6/2017 | Sul et al. |
| 2017/0309380 A1 | 10/2017 | Benedict et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |
| 2018/0023852 A1 | 1/2018 | Schroeder et al. |
| 2018/0045437 A1 | 2/2018 | Vetrovec |
| 2018/0195775 A1 | 7/2018 | Schroeder et al. |
| 2018/0283740 A1 | 10/2018 | Holladay et al. |
| 2018/0340715 A1 | 11/2018 | Benedict et al. |
| 2019/0206578 A1 | 7/2019 | Wong |

FOREIGN PATENT DOCUMENTS

| | | |
|---|---|---|
| CN | 1977131 A | 6/2007 |
| CN | 101280983 A | 10/2008 |
| CN | 101495818 A | 7/2009 |
| CN | 101842647 A | 9/2010 |
| CN | 101979937 A | 2/2011 |
| CN | 201772566 U | 3/2011 |
| CN | 102165615 A | 8/2011 |
| CN | 101788207 B | 9/2011 |
| CN | 102345942 A | 2/2012 |
| CN | 202432596 U | 9/2012 |
| CN | 103090583 A | 5/2013 |
| CN | 103712401 A | 4/2014 |
| CN | 102077303 B | 4/2015 |
| CN | 106481842 A | 3/2017 |
| CN | 106949673 A | 7/2017 |
| CN | 107003041 A | 8/2017 |
| DE | 84694 C | 4/1951 |
| DE | 1514388 A1 | 6/1969 |
| DE | 102013223959 A1 | 5/2015 |
| DE | 202015106851 U1 | 3/2016 |
| EP | 0187078 A1 | 7/1986 |
| EP | 2071255 A1 | 6/2009 |
| EP | 2108904 A1 | 10/2009 |
| EP | 2215955 A1 | 8/2010 |
| EP | 2322072 A2 | 5/2011 |
| EP | 2420760 A1 | 2/2012 |
| EP | 2813785 A1 | 12/2014 |
| EP | 3306082 A2 | 4/2018 |
| FR | 2935468 A1 | 3/2010 |
| JP | 59232922 A | 12/1984 |
| JP | H08166182 A | 6/1996 |
| JP | 3205196 B2 | 9/2001 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| JP | 2010525291 A | 7/2010 |
| JP | 6212955 B2 | 12/2014 |
| JP | 2014228216 A | 12/2014 |
| JP | 5907023 B2 | 4/2016 |
| JP | 6079498 B2 | 2/2017 |
| JP | 6191539 B2 | 9/2017 |

(56) References Cited

FOREIGN PATENT DOCUMENTS

| | | | |
|---|---|---|---|
| JP | 2017207222 A | 11/2017 | |
| KR | 101100301 B1 | 12/2011 | |
| KR | 101238234 B1 | 3/2013 | |
| WO | WO0133145 A1 | 5/2001 | |
| WO | WO0212800 A1 | 2/2002 | |
| WO | WO03016794 A1 | 2/2003 | |
| WO | WO2004/068512 A1 | 8/2004 | |
| WO | WO2007/036729 A1 | 4/2007 | |
| WO | WO2007/086638 A1 | 8/2007 | |
| WO | WO2009/024412 A1 | 2/2009 | |
| WO | WO2009/098391 A1 | 8/2009 | |
| WO | WO2010/119591 A1 | 10/2010 | |
| WO | WO2011034594 A1 | 3/2011 | |
| WO | WO2011152179 A1 | 12/2011 | |
| WO | WO2014099199 A1 | 6/2014 | |
| WO | WO2014170447 A1 | 10/2014 | |
| WO | WO2014173787 A1 | 10/2014 | |
| WO | WO2015017230 A1 | 2/2015 | |
| WO | WO2016005774 A1 | 1/2016 | |
| WO | WO2016035267 A1 | 3/2016 | |
| WO | WO2017042266 A1 | 3/2017 | |
| WO | WO2017081048 A2 | 5/2017 | |
| WO | WO2017097989 A1 | 6/2017 | |

OTHER PUBLICATIONS

International Search Report issued in connection with PCT Application No. PCT/US2014/042485 dated Oct. 23, 2014.

International Search Report issued in connection with PCT Application No. PCT/US2014/017431 dated May 9, 2014.

International Search Report issued in connection with PCT/US2013/070518, dated Jan. 22, 2014.

Tetsuji Okamura, Performance of a room-temperature rotary magnet refrigerator, dated Nov. 28, 2005, Elsevier.

Journal of Alloys and Compounds, copyright 2008 Elsevier B..V. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

PCT International Search Report and Written Opinion issued in connection with PCT Application No. PCT/US2013/070023 dated Feb. 27, 2014.

Barbara Pulko, Epoxy-bonded La—Fe—Co—Si magnetocaloric plates, Journal of Magnetism and Magnetic Materials, 375 (2015) 65-73.

International Search Report of PCT/US2014/047925 dated Nov. 10, 2014.

Andrej Kitanovski, Present and future caloric refrigeration and heat-pump technologies, International Journal of Refrigeration, vol. 57, Sep. 2015, pp. 288-298.

C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.

International Search Report, PCT Application No. PCT/CN2019/096188, dated Oct. 15, 2019, 5 pages.

International Search Report, PCT Application No. PCT/CN2019/096187, dated Sep. 30, 2019, 4 pages.

* cited by examiner

UNEVEN FLOW VALVE FOR A CALORIC REGENERATOR

FIELD OF THE INVENTION

The present subject matter relates generally to caloric heat pumps for appliances.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or transfer heat energy from one location to another. This cycle can be used to receive heat from a refrigeration compartment and reject such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of MCMs become more ordered under an increasing, externally applied magnetic field and cause the MCMs to generate heat. Conversely, decreasing the externally applied magnetic field allows the magnetic moments of the MCMs to become more disordered and allow the MCMs to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCMs can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in a refrigerator appliance would also be useful.

BRIEF DESCRIPTION OF THE INVENTION

Aspects and advantages of the invention will be set forth in part in the following description, or may be apparent from the description, or may be learned through practice of the invention.

In a first example embodiment, a caloric regenerator system includes a flow body that defines a plurality of cold side channels, a plurality of hot side channels and a central passage. The plurality of cold side channels are spaced from the plurality of hot side channels within the flow body along an axial direction. Each of the plurality of cold side channels extends from the central passage along a radial direction. The cold side channels of the plurality of cold side channels are distributed within the flow body along a circumferential direction. Each of the plurality of hot side channels extends from the central passage along the radial direction. The hot side channels of the plurality of hot side channels are distributed within the flow body along the circumferential direction. A port body is received within the central passage of the flow body such that the flow body is rotatable relative to the port body. The port body defines a hot side port and a cold side port. The hot side port is spaced from the cold side port on the port body along the axial direction. The hot side port is positioned coplanar with the plurality of hot side channels in a plane that is perpendicular to the axial direction. The cold side port is positioned coplanar with the plurality of cold side channels in another plane that is perpendicular to the axial direction. The hot side port defines a width along the circumferential direction. The cold side port defines a width along the circumferential direction. The width of the hot side port is less than the width of the cold side port. An annular caloric regenerator is in flow communication with the plurality of cold side channels and the plurality of hot side channels such that a heat transfer fluid is flowable into the annular caloric regenerator through the plurality of cold side channels and out of the annular caloric regenerator through the plurality of hot side channels.

In a second example embodiment, a caloric regenerator system includes a flow body that defines a plurality of cold side channels, a plurality of hot side channels and a central passage. The plurality of cold side channels are spaced from the plurality of hot side channels within the flow body along an axial direction. Each of the plurality of cold side channels extends from the central passage along a radial direction. The cold side channels of the plurality of cold side channels are distributed within the flow body along a circumferential direction. Each of the plurality of hot side channels extends from the central passage along the radial direction. The hot side channels of the plurality of hot side channels are distributed within the flow body along the circumferential direction. A port body is received within the central passage of the flow body such that the flow body is rotatable relative to the port body. The port body defines a hot side port and a cold side port. The hot side port is spaced from the cold side port on the port body along the axial direction. The hot side port is positioned coplanar with the plurality of hot side channels in a plane that is perpendicular to the axial direction. The cold side port is positioned coplanar with the plurality of cold side channels in another plane that is perpendicular to the axial direction. The hot side port defines a width along the circumferential direction. The cold side port defines a width along the circumferential direction. The width of the hot side port is less than the width of the cold side port. An annular caloric regenerator is in flow communication with the plurality of cold side channels and the plurality of hot side channels such that a heat transfer fluid is flowable into the annular caloric regenerator through the plurality of cold side channels and out of the annular caloric regenerator through the plurality of hot side channels. A hot side seal extends around the hot side port. The hot side seal spans a gap between the port body and the flow body along the radial direction at the hot side port. A cold side seal extends around the cold side port. The cold side seal spans a gap between the port body and the flow body along the radial direction at the cold side port. A pump is operable to flow the heat transfer fluid. A field generator is configured to apply a field to a portion of the annular caloric regenerator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
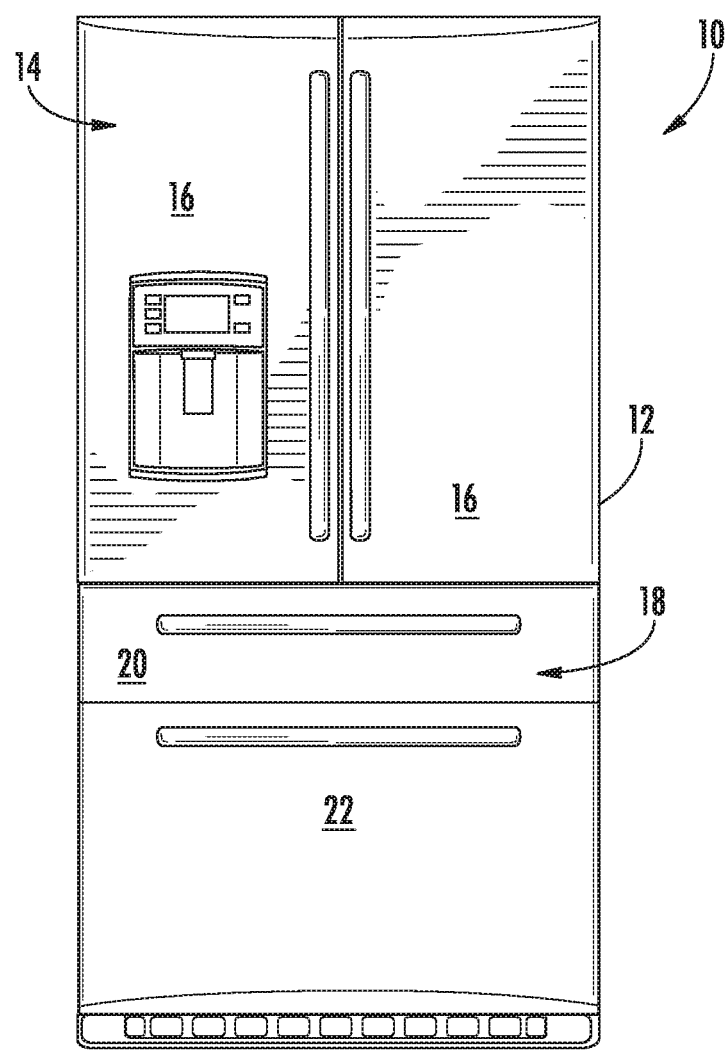
FIG. 1 is a front elevation view of a refrigerator appliance according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a caloric heat pump system for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool liquid/water within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Referring now to FIG. 1, an example embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms.

Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present invention is not limited to appliances and may be used in other applications as well such as e.g., air-conditioning, electronics cooling devices, and others. Further, it should be understood that while the use of a heat pump to provide cooling within a refrigerator is provided by way of example herein, the present invention may also be used to provide for heating applications as well.

Figure 2:
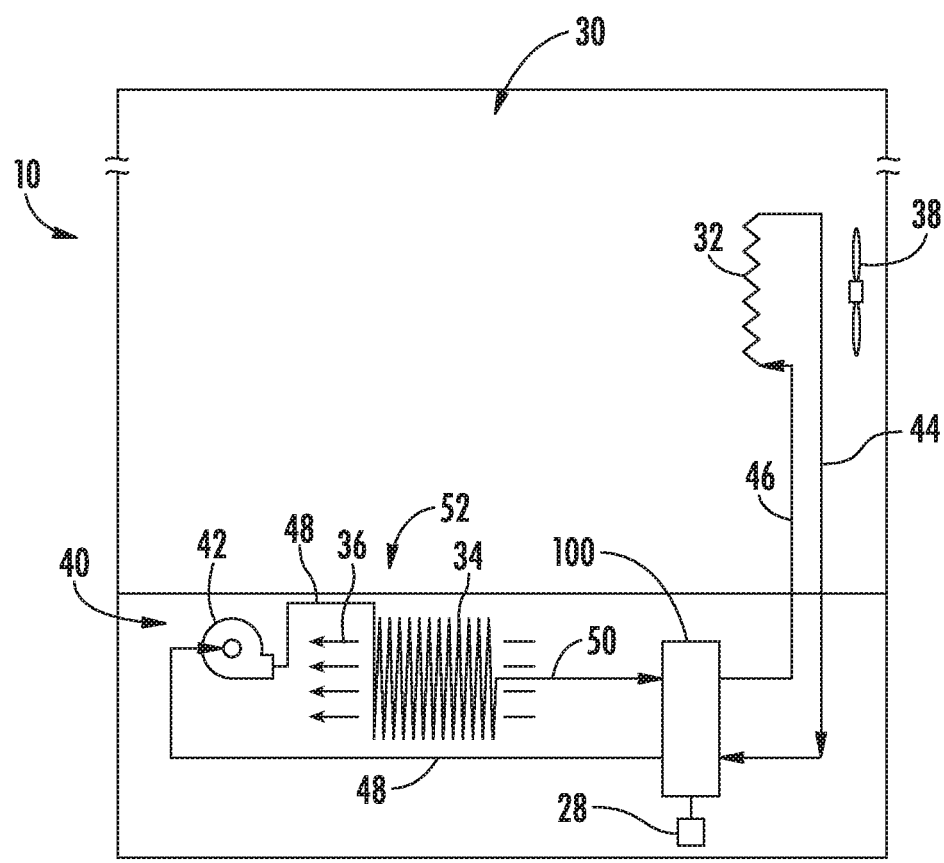
FIG. 2 is a schematic illustration of a heat pump system of the example refrigerator appliance of FIG. 1.

FIG. 2 is a schematic view of the refrigerator appliance 10. As may be seen in FIG. 2, refrigerator appliance 10 includes a refrigeration compartment 30 and a machinery compartment 40. Machinery compartment 30 includes a heat pump system 52 having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling contents of the refrigeration compartment 30. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat from caloric material in heat pump 100 and carries this heat by line 48 to pump 42 and then to second heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52.

Motor 28 is in mechanical communication with heat pump 100 as will further described.

From second heat exchanger 34 the heat transfer fluid returns by line 50 to heat pump 100 where, as will be further described below, the heat transfer fluid loses heat to the caloric material in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well. For example, heat pump system 52 may be configured such that the caloric material in heat pump 100 directly cools air that flows through refrigeration compartment 30 and directly heats air external to refrigeration compartment 30. Thus, system 52 need not include a liquid working fluid in certain example embodiments.

Figure 3:
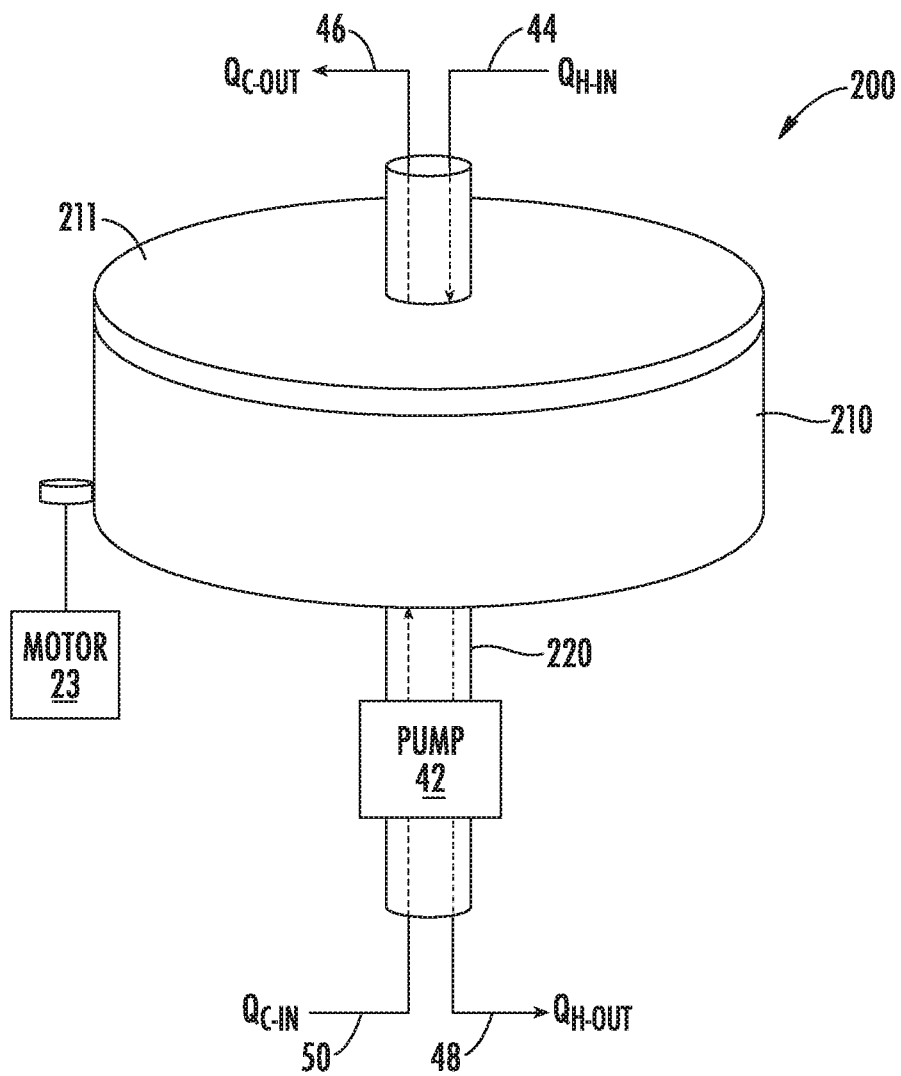
FIG. 3 is a schematic view of a caloric regenerator system according to an example embodiment of the present subject matter.

FIG. 3 is a schematic view of a caloric regenerator system 200 according to an example embodiment of the present subject matter. Caloric regenerator system 200 may be used in system 52 as heat pump 100, e.g., such that system 52 is a caloric heat pump system. Caloric regenerator system 200 may be used in any other suitable heat pump system in alternative example embodiments. As discussed in greater detail below, caloric regenerator system 200 includes features for regulating fluid flow through a caloric material, e.g., such that fluid flow through the caloric material has a lesser velocity when the caloric material is out of field and a greater velocity when the caloric material is in field.

Figure 4:
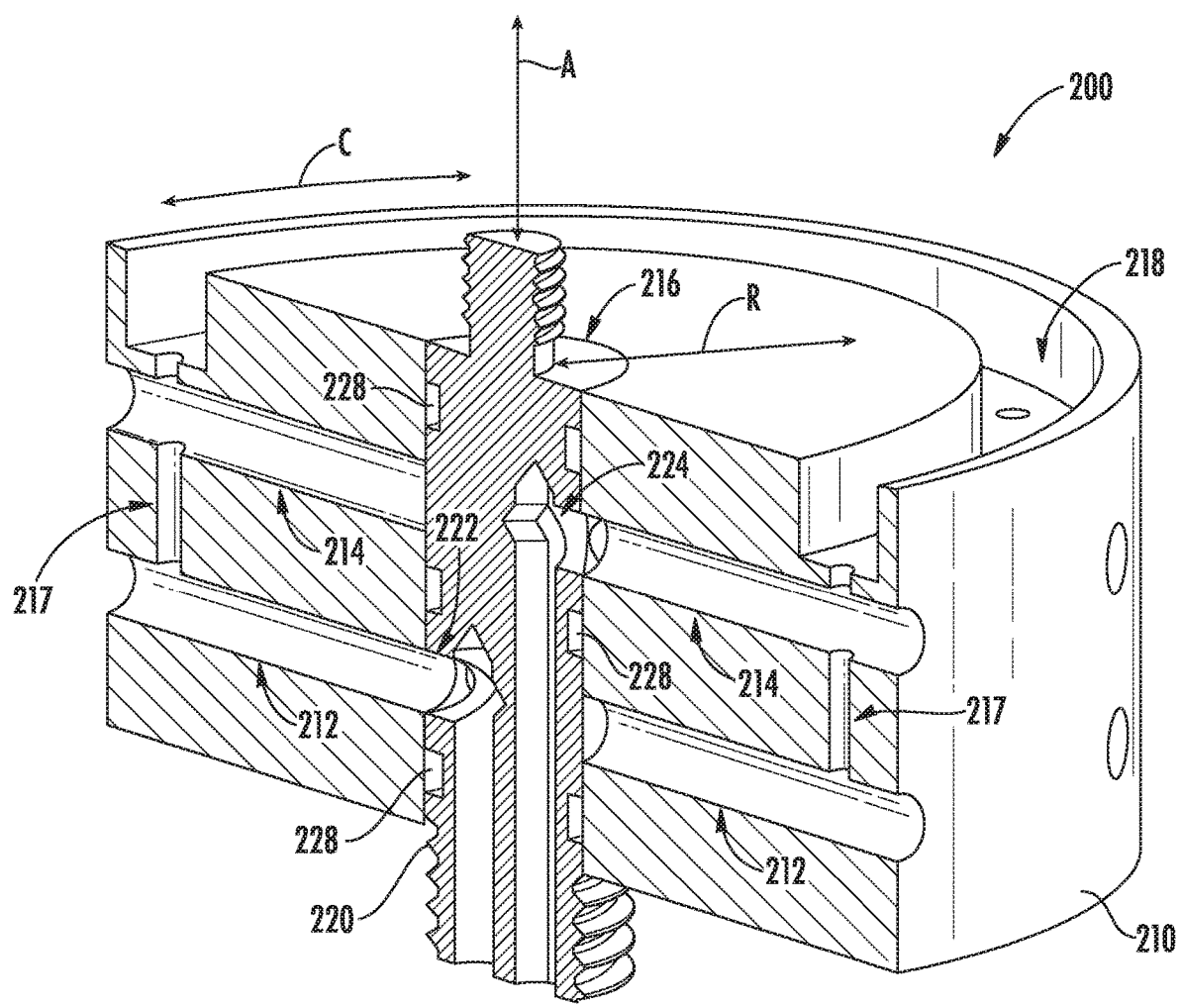
FIGS. 4 through 6 are section views of a flow body and port body of the example caloric regenerator system of FIG. 3.
Figure 5:
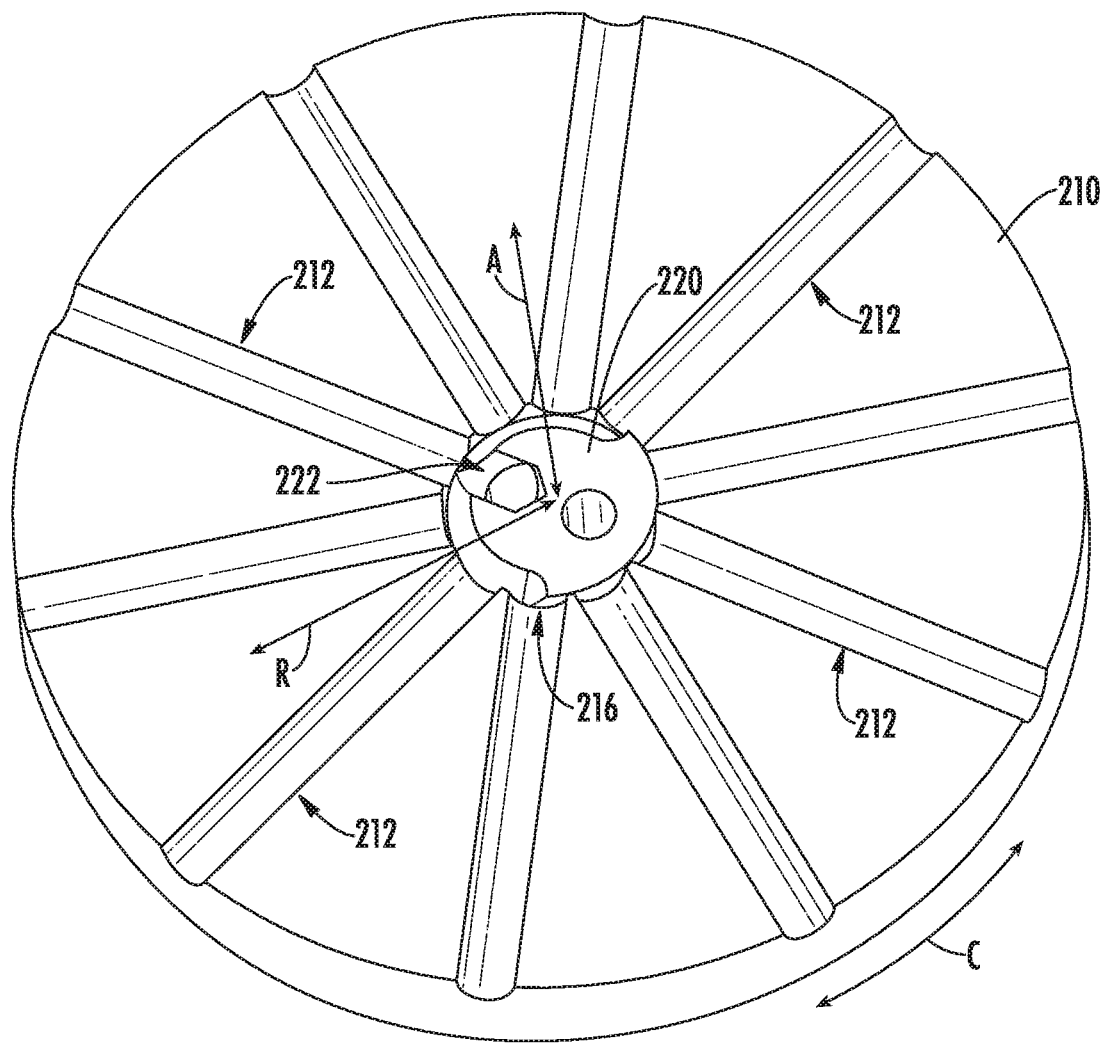
Figure 6:
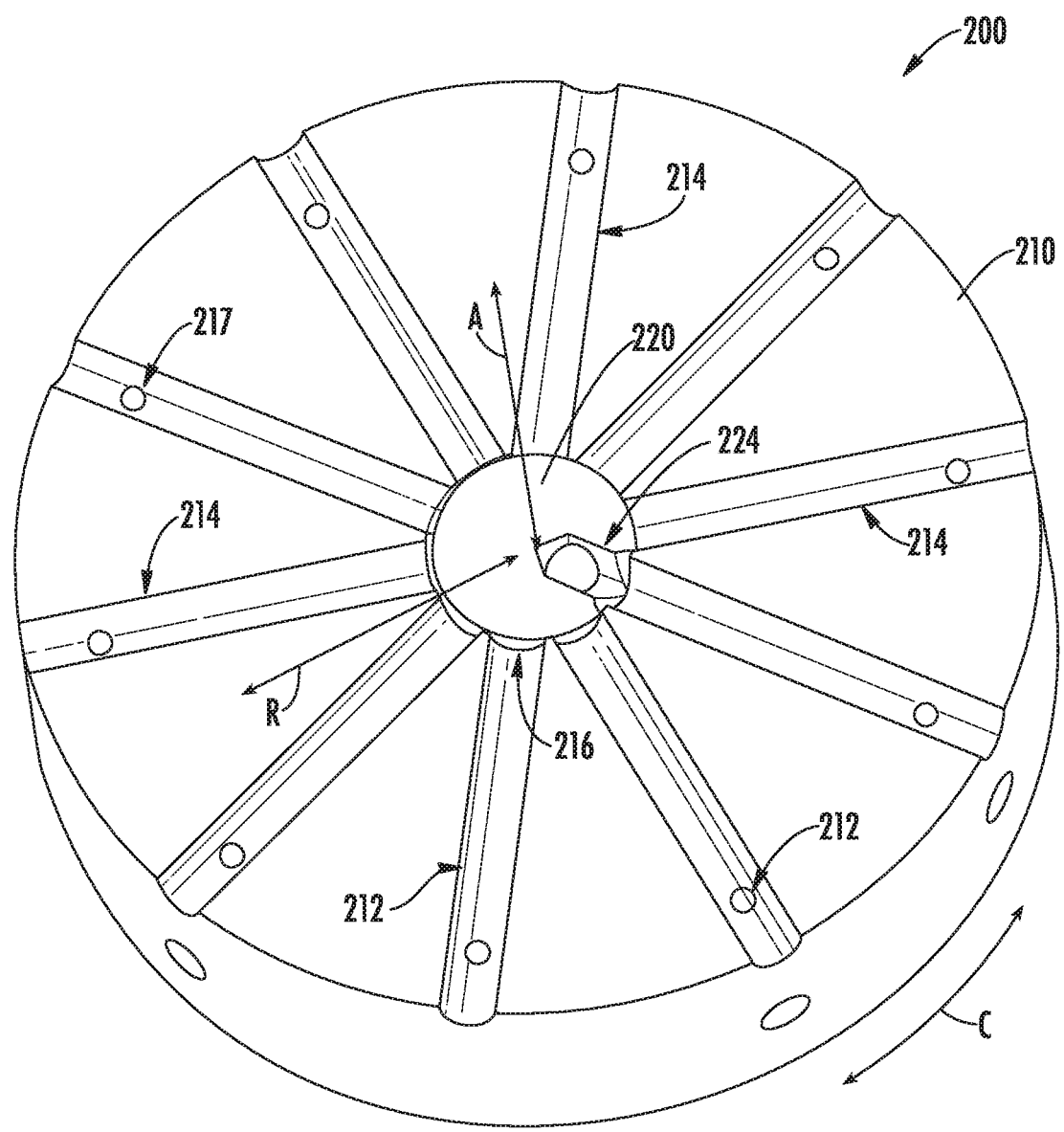

FIGS. 4 through 6 are section views of certain components of caloric regenerator system 200. With reference to FIGS. 3 through 6, caloric regenerator system 200 includes a flow body 210 and a port body 220. Flow body 210 defines a plurality of cold side channels 212, a plurality of hot side channels 214 and a central passage 216. Port body 220 is received within flow body 210 at central passage 216 of flow body 210. Flow body 210 is rotatable relative to port body 220 in central passage 216. For example, flow body 210 may rotate on port body 220. In particular, motor 23 may be coupled to flow body 210, and port body 220 may be fixed to a stationary structure, such as an appliance cabinet. Motor 23 may rotate flow body 210 relative to port body 220 during operation of motor 23.

Pump 43 may be operable to flow heat transfer fluid through cold side channels 212 and hot side channels 214. Flow body 210 and port body 220 cooperate to collectively form an uneven flow valve that regulates the flow of heat transfer fluid through cold side channels 212 and hot side channels 214. Operation of caloric regenerator system 200 and the flow of heat transfer fluid within caloric regenerator system 200 during operation of caloric regenerator system 200 are discussed in greater detail below.

Cold side channels 212 are spaced from hot side channels 214 within flow body 210, e.g., along an axial direction A. Thus, e.g., heat transfer fluid flowing through cold side channels 212 may be separate from heat transfer fluid flowing through hot side channels 214. However, flow body 210 may also define a plurality of connecting channels 217. Each connecting channel 217 may extend between a respective pair of hot and cold side channels 212, 214, e.g., along the axial direction A, to allow fluid flow from both hot and cold side channels 212, 214 to a recess 218, as discussed in greater detail below. Each cold side channel 212 also extends from central passage 216 along a radial direction R. In addition, cold side channels 212 are distributed, e.g., uniformly, within flow body 210 along a circumferential direction C. As may be seen from the above, cold side channels 212 may be distributed in a radial array within flow body 210.

Like cold side channels 212, each hot side channel 214 extends from central passage 216 along the radial direction R. However, as noted above, hot side channels 214 may be positioned is a separate axial cross-section of flow body 210 as shown in FIGS. 5 and 6. Hot side channels 214 are also distributed, e.g., uniformly, within flow body 210 along the circumferential direction C. Thus, hot side channels 214 may be distributed in a radial array within flow body 210.

In the example embodiments shown in FIGS. 5 and 6, flow body 210 defines ten cold side channels 212 and ten hot side channels 214. It will be understood that flow body 210 may include more or less cold side channels 212 and/or hot side channels 214 in alternative example embodiments. For example, flow body 210 may include no less than seven cold side channels 212 and no less than seven hot side channels 214 in certain example embodiments. The number of cold side channels 212 may be equal or unequal to the number of hot side channels 214.

Figure 7:
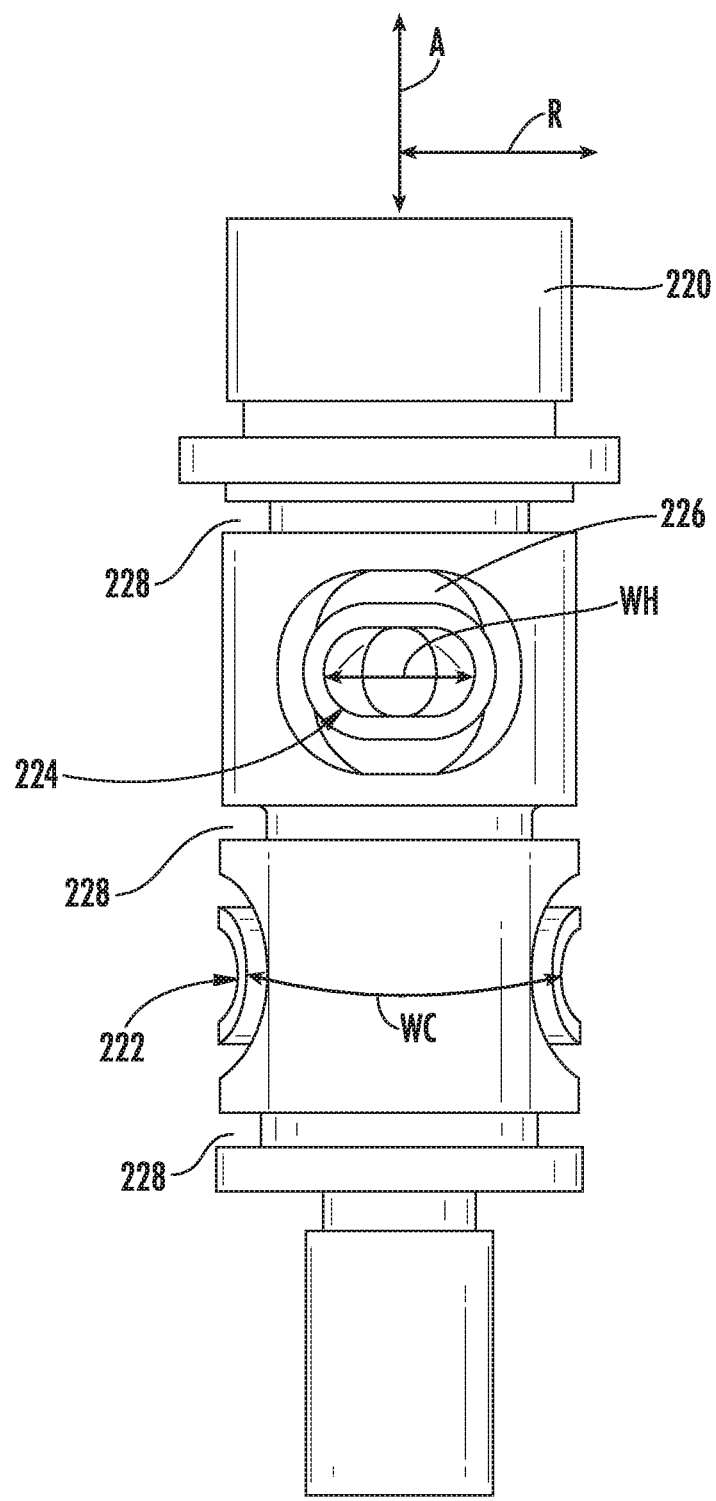
FIGS. 7 and 8 are elevation views of the port body of the example caloric regenerator system of FIG. 3.
Figure 8:
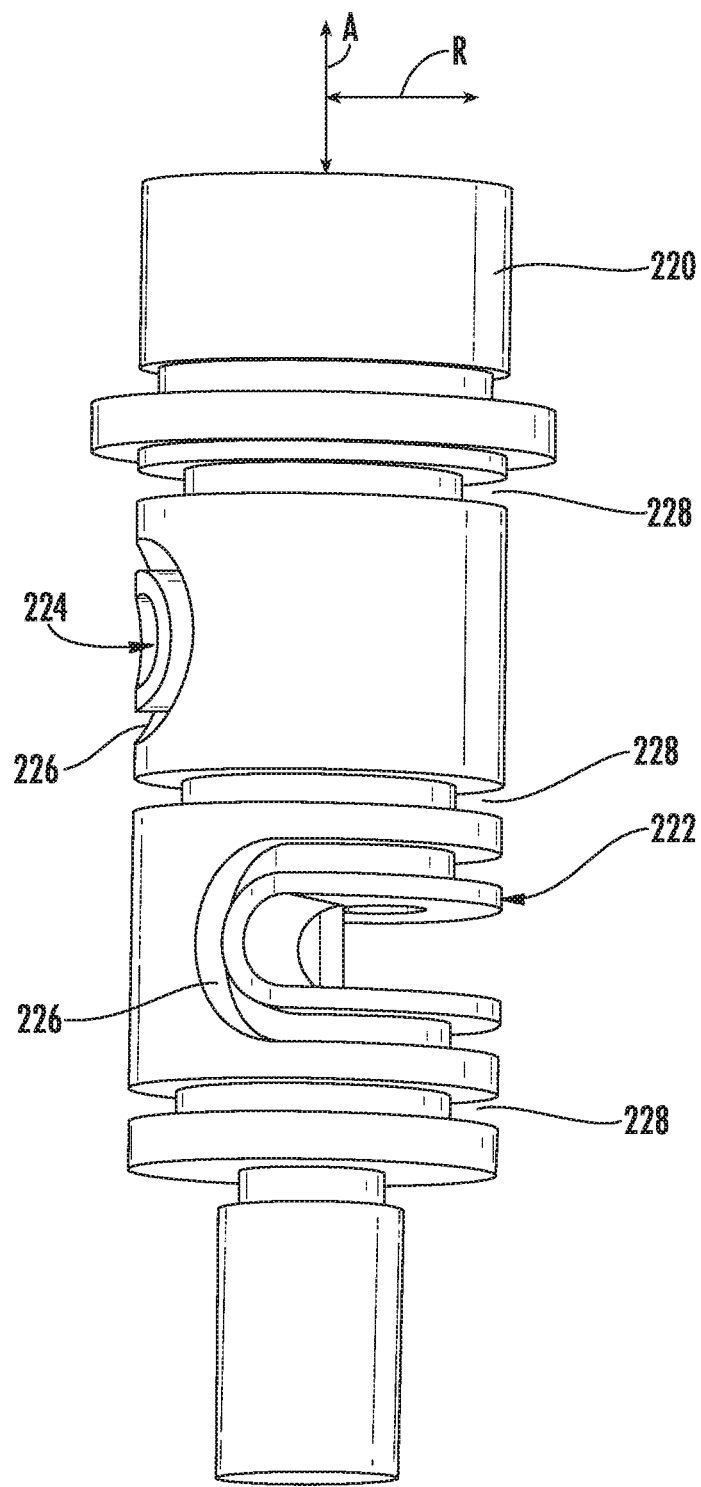

FIGS. 7 and 8 are elevation views of port body 220. With reference to FIGS. 3 through 8, port body 220 defines a cold side port 222 and a hot side port 224. Hot side port 224 is spaced from cold side port 222 on port body 220, e.g., the axial direction A and/or the circumferential direction C. In addition, cold side port 222 may be positioned coplanar with cold side channels 212, e.g., in a first plane that is perpendicular to the axial direction A. Conversely, hot side port 224 may be positioned coplanar with hot side channels 214, e.g., in a second plane that is perpendicular to the axial direction A. The first plane may be spaced from the second plane along the axial direction A.

Port body 220 may be received within central passage 216 of flow body 210 such that cold side port 222 is aligned and in fluid communication with one or more of cold side channels 212 and hot side port 224 is aligned and in fluid communication with one or more of hot side channels 214. In particular, as flow body 210 relative to port body 220, cold side port 222 may be aligned and in fluid communication with a varying subset of cold side channels 212 and hot side port 224 may be aligned and in fluid communication with a varying subset of hot side channels 214. In the example shown in FIGS. 5 and 6, cold side port 222 is aligned and in fluid communication with six of cold side channels 212 at any particular rotational position of flow body 210 relative to port body 220, and hot side port 224 is aligned and in fluid communication with one of hot side channels 214 at any particular rotational position of flow body 210 relative to port body 220. The particular number of connections may vary in alternative example embodiments.

Caloric regenerator system 200 may also include seals 226 and/or seals 228. Each seal 226 extends around a respective one of cold side port 222 and hot side port 224. In addition, each seal 226 may extend along the radial direction R between flow body 210 and port body 220. Thus, seals 226 may limit fluid flow at the interface between flow body 210 and port body 220. Seals 228 may extend around port body 220, e.g., along the circumferential direction C, and may also extend along the radial direction R between flow body 210 and port body 220. In addition, seals 228 may be positioned at opposite each other about cold side port 222 and hot side port 224. Seals 228 also assist with limiting fluid flow at the interface between flow body 210 and port body 220. An outer diameter of port body 220 may also be selected to complement a diameter of central passage 216 of flow body 210 in order to limit fluid flow at the interface between flow body 210 and port body 220. Thus, thermal losses and short circuiting of heat transfer fluid within caloric regenerator system 200 may be reduced with seals 226, seals 228 and/or with suitable sizing of port body 220 relative to central passage 216.

Seals 226 and/or seals 228 may be constructed of or with suitable materials. For example, each seal 226 and/or seal 228 may include one or more of an elastomer, polytetrafluoroethylene and polyurethane. As a particular example, each seal 226 and/or seal 228 may include an elastomer ring positioned on port body 220 that urges a polytetrafluoroethylene or polyurethane ring against flow body 210 along the radial direction R. Thus, the elastomer may act as a spring, applying consistent sealing pressure to the polytetrafluoroethylene or polyurethane ring towards the flow body 210 along the radial direction R. The polytetrafluoroethylene or polyurethane ring may contact flow body 210 but with relatively low friction compared to other materials, such as elastomers, to thus limit interference by the seals with the rotation of flow body 210 relative to port body 220.

Turning now to FIGS. 7 and 8, cold side port 222 defines a width WC, e.g., along the circumferential direction C. Hot side port 224 also defines a width WH, e.g., along the circumferential direction C. The width WH of hot side port 224 is less than the width WC of cold side port 222. As an example, the width WH of hot side port 224 may be no greater than half the width WC of cold side port 222. As another example, the width WH of hot side port 224 may be no greater than a quarter of the width WC of cold side port 222. Such sizing of the width WH of hot side port 224 relative to the width WC of cold side port 222 may advantageously allow heat transfer fluid to flow more slowly through caloric material when the caloric material is out of field than when the caloric material is in field, as described in greater detail below.

Figure 9:
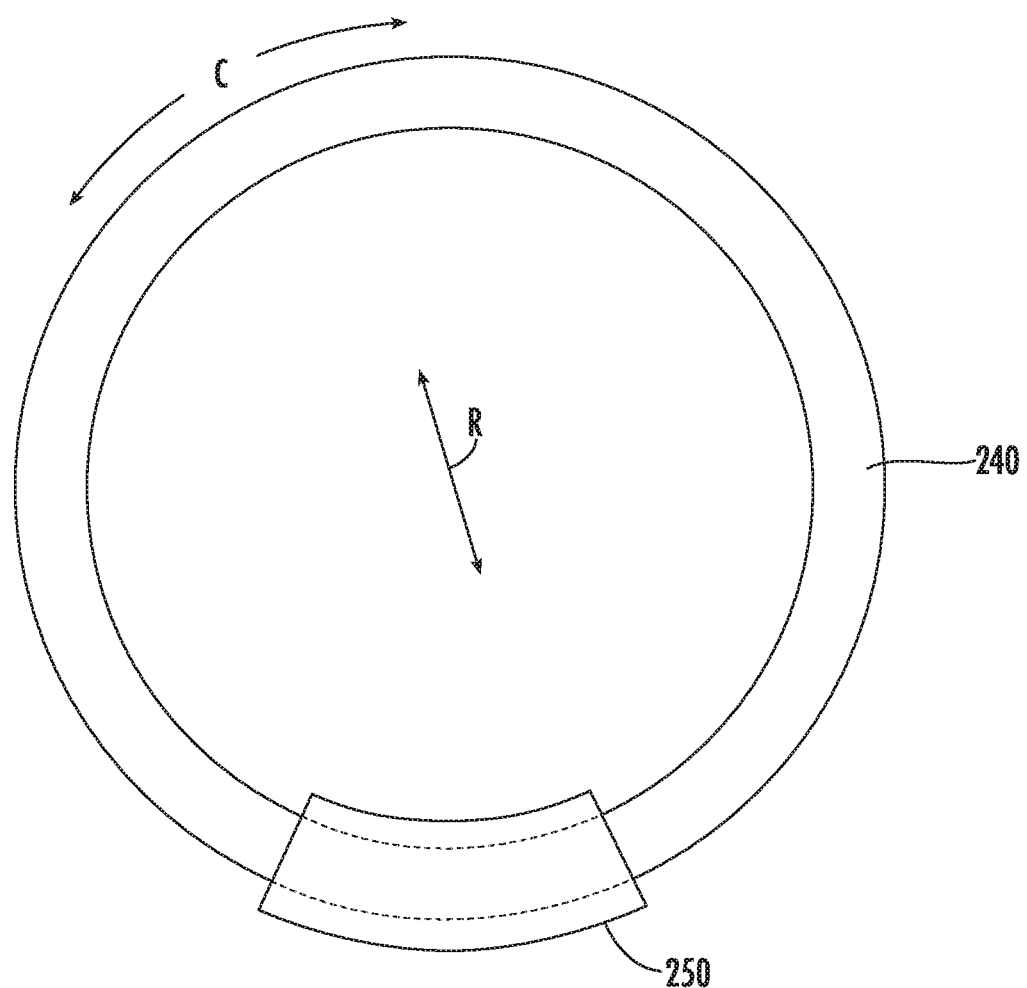
FIG. 9 is a schematic view of an annular caloric regenerator and field generator of the example caloric regenerator system of FIG. 3.

FIG. 9 is a schematic view of an annular caloric regenerator 240 and a field generator 250 of caloric regenerator system 200. Annular caloric regenerator 240 may be received within a recess 218 (FIG. 4) defined by flow body 210. Recess 218 and annular caloric regenerator 240 may be enclosed with a cover 211 of fluid body 210. Thus, e.g., annular caloric regenerator 240 may rotate with flow body 210 during operation of motor 23. In contrast, field generator 250 may be fixed, e.g., relative to port body 220, such that field generator 250 does not rotate with flow body 210 during operation of motor 23.

Field generator 250 is configured to generate a field that reacts with a caloric material in annular caloric regenerator 240. Thus, e.g., the field from field generator 250 may generate phase changes within the caloric material in annular caloric regenerator 240 that result in temperature changes of the caloric material in annular caloric regenerator 240. Field generator 250 may be a magnet, and annular caloric regenerator 240 may include magneto-caloric material in certain example embodiments.

The caloric material in annular caloric regenerator 240 may be constructed from a single caloric material or may include multiple different caloric materials. By way of example, appliance 10 may be used in an application where the ambient temperature changes over a substantial range. However, a specific caloric material may exhibit the caloric effect over only a much narrower temperature range. As such, it may be desirable to use a variety of caloric materials within a given portion of annular caloric regenerator 240 to accommodate the wide range of ambient temperatures over which appliance 10 and/or caloric regenerator system 200 may be used.

Field generator 250 is sized such that only a portion of annular caloric regenerator 240 is positioned within the field of field generator 250, the portion is shown with dashed lines in FIG. 9. As flow body 210 rotates, the portion of annular caloric regenerator 240 with the field of field generator 250 changes. For example, motor 23 may continuously rotate annular caloric regenerator 240 along the circumferential direction C, e.g., such that entire annular caloric regenerator 240 cycles through the field of field generator 250 during operation of motor 23.

The portion of annular caloric regenerator 240 that is positioned within the field of field generator 250 may be less than the portion of annular caloric regenerator 240 that is positioned out of the field of field generator 250. For example, annular caloric regenerator 240 and field generator 250 may be sized such that the portion of annular caloric regenerator 240 that is positioned within the field of field generator 250 is no great than half, no greater than a quarter, no greater than a third, etc. of the portion of annular caloric regenerator 240 that is positioned out of the field of field generator 250. Such sizing may facilitate efficient operation of caloric regenerator system 200, as described in greater detail below.

When field generator 250 is a magnet and annular caloric regenerator 240 includes magneto-caloric material, the magneto-caloric material in the annular caloric regenerator 240 may move into and out of the magnetic field from the magnet. Movement of magneto-caloric material of annular caloric regenerator 240 into the magnetic field from the magnet may cause the magnetic moments of the magneto-caloric material to orient and the magneto-caloric material to heat (or alternatively cool) as part of the magneto-caloric effect. Conversely, movement of magneto-caloric material of annular caloric regenerator 240 out of the magnetic field from the magnet may cause the magnetic moments of the magneto-caloric material to disorient and the magneto-caloric material to cool (or alternatively heat) as part of the magneto-caloric effect. Being "out" of the magnetic field means that the magneto-caloric material is generally or substantially uninfluenced by the magnetic field from the magnet. Accordingly, the magneto-caloric material may not be actively heating (or cooling) as it would if within the magnetic field (and instead may be actively or passively cooling (or heating) due to such removal of the magnetic field). Being "in" the magnetic field means that the magneto-caloric material is generally or substantially influenced by the magnetic field from the magnet. Accordingly, the magneto-caloric material may not be actively cooling (or heating) as it would if out of the magnetic field (and instead may be actively or passively heating (or cooling) due to the reaction of the magneto-caloric material to the magnetic field).

Annular caloric regenerator 240 is in flow communication with cold side channels 212 and hot side channels 214. Thus, heat transfer fluid is flowable into annular caloric regenerator 240, e.g., through cold side channels 212, and out of annular caloric regenerator 240, e.g., through hot side channels 214. The heat transfer fluid may reject heat to or receive heat from the caloric material in annular caloric regenerator 240.

Figure 10:
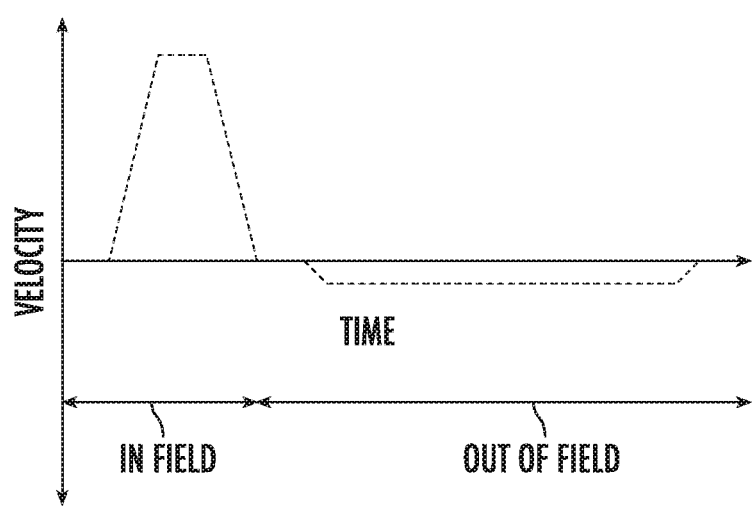
FIG. 10 is a plot of velocity versus time of a heat transfer fluid through a section of the annular caloric regenerator of FIG. 9 during operation of the example caloric regenerator system of FIG. 3.

FIG. 10 is a plot of velocity versus time of the heat transfer fluid through a section or portion of annular caloric regenerator 240 during operation of caloric regenerator system 200. With reference to FIGS. 3, 9 and 10, the portion of the caloric material in annular caloric regenerator 240 rotates into and out of the field from field generator 250 during operation of motor 23. Pump 42 also operates to flow the heat transfer fluid through the portion of the caloric material in annular caloric regenerator 240 during such rotation as shown in FIG. 10. Pump 42 may continuously flow the heat transfer fluid during operation of motor 28. Thus, pump 42 may be a steady flow pump. In alternative example embodiments, pump 42 may be a positive displacement pump.

When the portion of the caloric material in annular caloric regenerator 240 is fully within the field from field generator 250, the caloric material may heat as part of the caloric effect due to phase changes within the caloric material. In turn, the heat transfer fluid may be heated by the caloric material when the portion of the caloric material in annular caloric regenerator 240 is within the field from field generator 250. As indicated by arrow $Q_{H\text{-}OUT}$ in FIG. 3, the heat transfer fluid heated by the caloric material may travel out of caloric regenerator system 200 along line 48 to second heat exchanger 34. At the same time, and as indicated by arrow $Q_{H\text{-}IN}$, heat transfer fluid from first heat exchanger 32 flows into caloric regenerator system 200 from line 44. Because heat transfer fluid from first heat exchanger 32 is relatively cooler than the caloric material, the caloric material rejects heat to the heat transfer fluid.

The heat transfer fluid flowing through the portion of the caloric material in annular caloric regenerator 240 has a relatively high velocity when within the field from field generator 250. Such high velocity may be caused by the sizing of width WH of hot side port 224 described above. For example, because the width WH of hot side port 224 allows only fluid communication with one of hot side channels 214, the heat transfer fluid flowing through the portion of the caloric material in annular caloric regenerator 240 may be forced to have a relatively high velocity due to the restriction generated by such sizing.

When the portion of the caloric material in annular caloric regenerator 240 is out of the field from field generator 250, the caloric material may cool as part of the caloric effect due to phase changes within the caloric material. In turn, the heat transfer fluid may be cooled by the caloric material when the portion of the caloric material in annular caloric regenerator 240 is outside of the field from field generator 250. As indicated by arrow $Q_{C\text{-}OUT}$ in FIG. 3, the heat transfer fluid cooled by the caloric material may travel out of caloric regenerator system 200 along line 46 to first heat exchanger 32. At the same time, and as indicated by arrow $Q_{C\text{-}IN}$, heat transfer fluid from second heat exchanger 34 flows into caloric regenerator system 200 from line 50. Because heat transfer fluid from second heat exchanger 34 is relatively warmer than the caloric material, the heat transfer fluid rejects heat to the caloric material.

The heat transfer fluid flowing through the portion of the caloric material in annular caloric regenerator 240 has a relatively low velocity when outside of the field from field generator 250. Such low velocity may be caused by the sizing of width WC of cold side port 222 described above. For example, because the width WC of cold side port 222 allows fluid communication with multiple cold side channels 212 (e.g., more cold side channels 212 than the width WH of hot side port 224 allows for fluid communication with hot side channels 214), the heat transfer fluid flowing through the portion of the caloric material in annular caloric regenerator 240 may be permitted to have a relatively low velocity due to the lesser restriction generated by such sizing.

Figure 11:
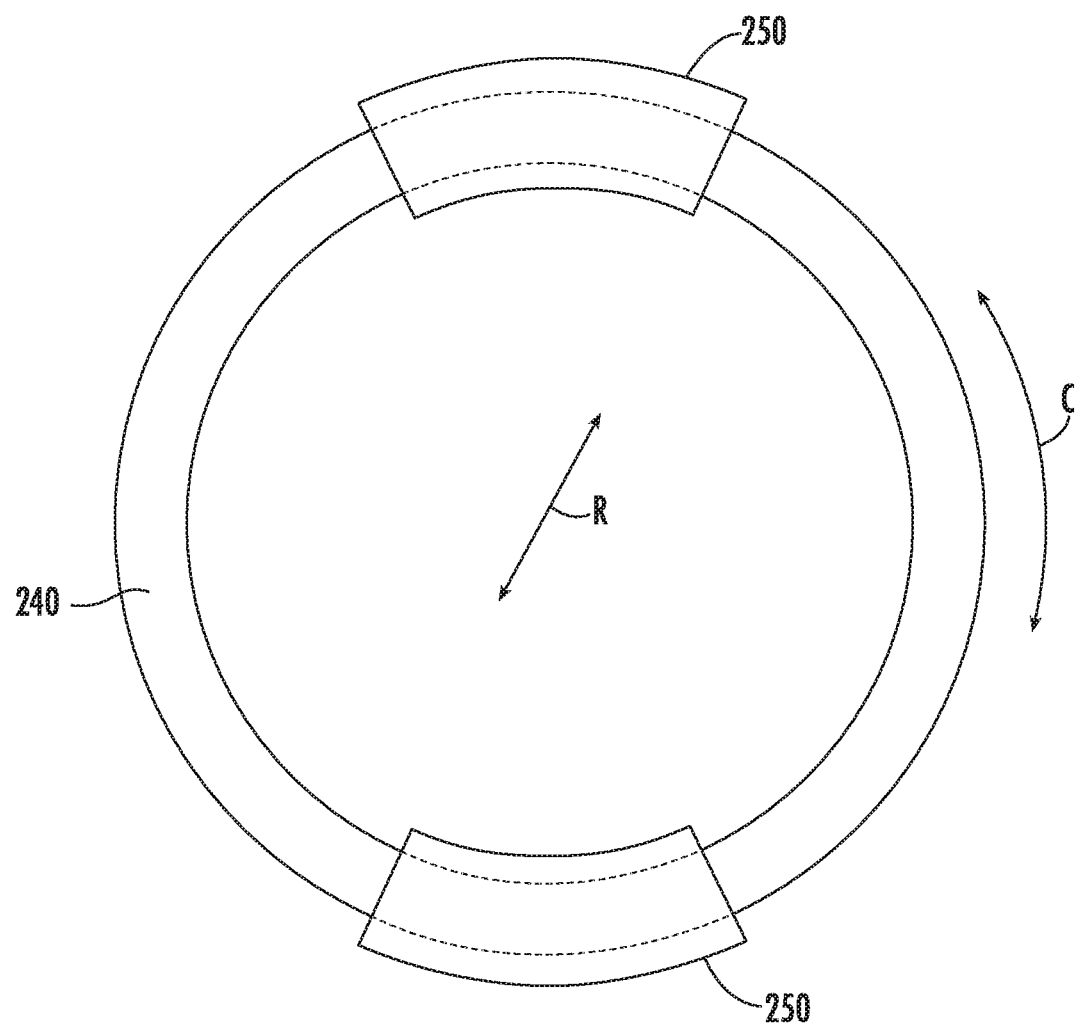
FIG. 11 is a schematic view of an annular caloric regenerator and with a pair of field generators according to another example embodiment of the present subject matter.
Figure 12:
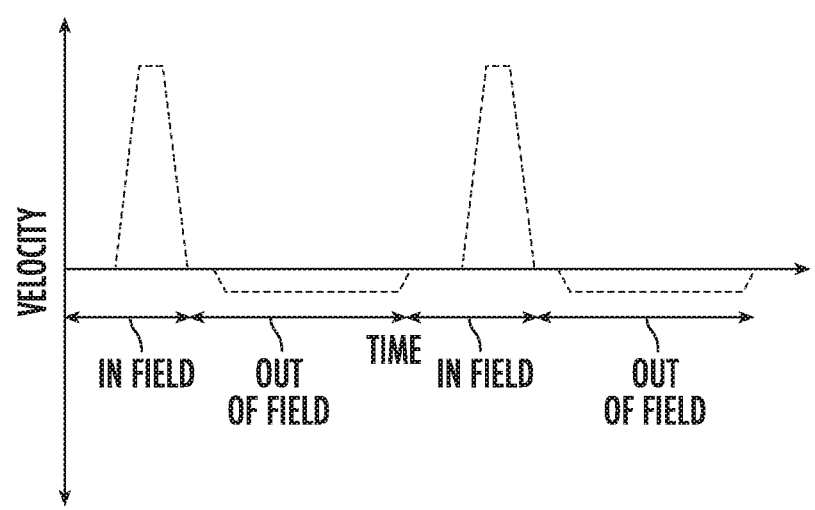
FIG. 12 is a plot of velocity versus time of a heat transfer fluid through a section of the annular caloric regenerator of FIG. 11 during operation of an associated caloric regenerator system.

FIG. 11 is a schematic view of annular caloric regenerator 240 and with a pair of field generators 250. FIG. 12 is a plot of velocity versus time of a heat transfer fluid through a section of annular caloric regenerator 240 of FIG. 11. As may be seen in FIG. 11, caloric regenerator system 200 may include multiple field generators 250 in certain example embodiments. In FIG. 11, one field generator 250 is positioned opposite another field generator 250 about annular caloric regenerator 240. Thus, as shown in FIG. 12, the velocity of heat transfer fluid flowing through the portion of the caloric material in annular caloric regenerator 240 has two peaks corresponding to when the portion of the caloric material in annular caloric regenerator 240 is within the field of each field generator 250. It will be understood that the positioning of field generator 250 may be changed in alternative example embodiments. For example, field generators 250 may be positioned adjacent each other on annular caloric regenerator 240. In addition, caloric regenerator system 200 may include one or more additional field generators 250 in alternative example embodiments.

As may be seen from the above, caloric regenerator system 200 may include an uneven flow valve that is configured to provide relatively short and fast heat transfer fluid flow toward a hot side of the caloric material and relatively long and slow heat transfer fluid flow toward a cold side of the caloric material. However, total displacement of the heat transfer fluid is the same in both directions. The uneven flow valve may be configured to provide any suitable velocity profile, e.g., as long as the average velocity of the heat transfer fluid is lower towards the cold side. The uneven flow valve may also be configured to provide zero velocity portions between the flow period towards the hot and cold sides. Thus, the heat transfer fluid may be stationary within the caloric material as the caloric material shifts from in field to out of field. The uneven flow valve may include a sliding seal valve on either end of the caloric material. Ports on a static component of the uneven flow valve may line up with different sections of a rotating component with the caloric material to direct flow.

In such a manner, a cost effective magneto-caloric regenerator system may have a relatively small magnetized regenerator portion (and thus a relatively large demagnetized portion) with an uneven flow profile. Viscous dissipation overall can be decreased, and the viscous dissipation on the cold side may be decreased the most. This is a critical loss area for performance, as generated heat must be provided by a pump and directly deducts from cooling ability of the magneto-caloric regenerator; a double impact on efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A caloric regenerator system, comprising:
a flow body defining a plurality of cold side channels, a plurality of hot side channels and a central passage, the plurality of cold side channels spaced from the plurality of hot side channels within the flow body along an axial direction, each of the plurality of cold side channels extending from the central passage along a radial direction, the cold side channels of the plurality of cold side channels distributed within the flow body along a circumferential direction, each of the plurality of hot side channels extending from the central passage along the radial direction, the hot side channels of the plurality of hot side channels distributed within the flow body along the circumferential direction;
a port body received within the central passage of the flow body such that the flow body is rotatable relative to the port body, the port body defining a hot side port and a cold side port, the hot side port spaced from the cold side port on the port body along the axial direction, the hot side port positioned coplanar with the plurality of hot side channels in a plane that is perpendicular to the axial direction, the cold side port positioned coplanar with the plurality of cold side channels in another plane that is perpendicular to the axial direction, the hot side port defining a width along the circumferential direction, the cold side port defining a width along the circumferential direction, the width of the hot side port being less than the width of the cold side port; and
an annular caloric regenerator in flow communication with the plurality of cold side channels and the plurality of hot side channels such that a heat transfer fluid is flowable into the annular caloric regenerator through the plurality of cold side channels and out of the annular caloric regenerator through the plurality of hot side channels.

2. The caloric regenerator system of claim 1, further comprising a hot side seal and a cold side seal, the hot side seal extending around the hot side port, the hot side seal spanning a gap between the port body and the flow body along the radial direction at the hot side port, the cold side seal extending around the cold side port, the cold side seal spanning a gap between the port body and the flow body along the radial direction at the cold side port.

3. The caloric regenerator system of claim 2, wherein the hot side seal, the cold side seal or both comprise one or more of an elastomer, polytetrafluoroethylene or polyurethane.

4. The caloric regenerator system of claim 3, wherein the hot side seal, the cold side seal or both comprise an elastomer ring positioned on the port body that urges a polytetrafluoroethylene or polyurethane ring against the flow body along the radial direction.

5. The caloric regenerator system of claim 1, further comprising a pump operable to flow the heat transfer fluid.

6. The caloric regenerator system of claim 5, further comprising a field generator configured to apply a field to a portion of the annular caloric regenerator.

7. The caloric regenerator system of claim 6, wherein the field generator is positioned such that a first portion of the annular caloric regenerator is in the field and a second portion of the annular caloric regenerator is out of the field, the first and second portions of the annular caloric regenerator each having a respective width along the circumferential direction, the width of the second portion of the annular caloric regenerator being greater than the width of the first portion of the annular caloric regenerator.

8. The caloric regenerator system of claim 7, wherein the widths of the hot and cold side ports are selected such that the heat transfer fluid in the first portion of the annular caloric regenerator has a higher velocity than the heat transfer fluid in the second portion of the annular caloric regenerator during operation of the pump.

9. The caloric regenerator system of claim 1, wherein the width of the hot side port is selected such that the hot side port is in fluid communication with a number of hot side channels in the plurality of hot side channels, the width of the cold side port selected such that the cold side port is in fluid communication with a number of cold side channels in the plurality of cold side channels, the number of hot side channels being less than the number of cold side channels.

10. The caloric regenerator system of claim 1, wherein the plurality of cold side channels comprises no less than seven cold side channels, and the plurality of hot side channels comprises no less than seven hot side channels.

11. The caloric regenerator system of claim 1, wherein a number of cold side channels in the plurality of cold side channels is equal to a number of hot side channels in the plurality of hot side channels.

12. The caloric regenerator system of claim 1, wherein the flow body defines a plurality of connecting channels, each connecting channel of the plurality of connecting channels extending between a respective pair of hot and cold side channels.

13. A caloric regenerator system, comprising:
a flow body defining a plurality of cold side channels, a plurality of hot side channels and a central passage, the plurality of cold side channels spaced from the plurality of hot side channels within the flow body along an axial direction, each of the plurality of cold side channels extending from the central passage along a radial direction, the cold side channels of the plurality of cold side channels distributed within the flow body along a circumferential direction, each of the plurality of hot side channels extending from the central passage along the radial direction, the hot side channels of the plurality of hot side channels distributed within the flow body along the circumferential direction;
a port body received within the central passage of the flow body such that the flow body is rotatable relative to the port body, the port body defining a hot side port and a cold side port, the hot side port spaced from the cold side port on the port body along the axial direction, the hot side port positioned coplanar with the plurality of hot side channels in a plane that is perpendicular to the axial direction, the cold side port positioned coplanar with the plurality of cold side channels in another plane that is perpendicular to the axial direction, the hot side port defining a width along the circumferential direction, the cold side port defining a width along the circumferential direction, the width of the hot side port being less than the width of the cold side port;
an annular caloric regenerator in flow communication with the plurality of cold side channels and the plurality of hot side channels such that a heat transfer fluid is flowable into the annular caloric regenerator through the plurality of cold side channels and out of the annular caloric regenerator through the plurality of hot side channels;
a hot side seal extending around the hot side port, the hot side seal spanning a gap between the port body and the flow body along the radial direction at the hot side port;

a cold side seal extending around the cold side port, the cold side seal spanning a gap between the port body and the flow body along the radial direction at the cold side port;

a pump operable to flow the heat transfer fluid; and a field generator configured to apply a field to a portion of the annular caloric regenerator.

14. The caloric regenerator system of claim 13, wherein the hot side seal, the cold side seal or both comprise one or more of an elastomer, polytetrafluoroethylene or polyurethane.

15. The caloric regenerator system of claim 14, wherein the hot side seal, the cold side seal or both comprise an elastomer ring positioned on the port body that urges a polytetrafluoroethylene or polyurethane ring against the flow body along the radial direction.

16. The caloric regenerator system of claim 13, wherein the field generator is positioned such that a first portion of the annular caloric regenerator is in the field and a second portion of the annular caloric regenerator is out of the field, the first and second portions of the annular caloric regenerator each having a respective width along the circumferential direction, the width of the second portion of the annular caloric regenerator being greater than the width of the first portion of the annular caloric regenerator.

17. The caloric regenerator system of claim 16, wherein the widths of the hot and cold side ports are selected such that the heat transfer fluid in the first portion of the annular caloric regenerator has a higher velocity than the heat transfer fluid in the second portion of the annular caloric regenerator during operation of the pump.

18. The caloric regenerator system of claim 13, wherein the width of the hot side port is selected such that the hot side port is in fluid communication with a number of hot side channels in the plurality of hot side channels, the width of the cold side port selected such that the cold side port is in fluid communication with a number of cold side channels in the plurality of cold side channels, the number of hot side channels being less than the number of cold side channels.

19. The caloric regenerator system of claim 13, wherein the plurality of cold side channels comprises no less than seven cold side channels, and the plurality of hot side channels comprises no less than seven hot side channels.

20. The caloric regenerator system of claim 13, wherein a number of cold side channels in the plurality of cold side channels is equal to a number of hot side channels in the plurality of hot side channels.

* * * * *